(12) United States Patent
Morgan

(10) Patent No.: US 8,726,141 B2
(45) Date of Patent: May 13, 2014

(54) CONTENT INTEGRITY MANAGEMENT SYSTEM

(75) Inventor: Oliver Morgan, Lexington, MA (US)

(73) Assignee: Metaglue Corporation, Lexington, MA (US)

( * ) Notice: Subject to any disclaimer, the term of this patent is extended or adjusted under 35 U.S.C. 154(b) by 775 days.

(21) Appl. No.: 12/914,060

(22) Filed: Oct. 28, 2010

(65) Prior Publication Data

US 2011/0099462 A1 Apr. 28, 2011

Related U.S. Application Data

(60) Provisional application No. 61/255,501, filed on Oct. 28, 2009.

(51) Int. Cl.
*G06F 11/10* (2006.01)

(52) U.S. Cl.
USPC .......................................... 714/807

(58) Field of Classification Search
USPC .......................................... 714/807
See application file for complete search history.

(56) References Cited

U.S. PATENT DOCUMENTS

| | | | |
|---|---|---|---|
| 5,809,145 A | 9/1998 | Slik et al. | |
| 6,725,274 B1 | 4/2004 | Slik | |
| 7,010,697 B2 | 3/2006 | Byrne et al. | |
| 7,028,071 B1 | 4/2006 | Slik | |
| 7,290,203 B2 * | 10/2007 | Emma et al. | 714/809 |
| 7,356,847 B2 | 4/2008 | Byrne et al. | |
| 7,546,486 B2 | 6/2009 | Slik et al. | |
| 7,565,384 B2 * | 7/2009 | Kano | 1/1 |
| 7,590,672 B2 | 9/2009 | Slik et al. | |
| 7,624,158 B2 | 11/2009 | Slik et al. | |
| 7,743,427 B2 | 6/2010 | Byrne et al. | |
| 7,770,230 B2 | 8/2010 | Byrne et al. | |
| 2012/0159287 A1 * | 6/2012 | Odinak | 714/784 |
| 2013/0304761 A1 * | 11/2013 | Redlich et al. | 707/781 |

OTHER PUBLICATIONS

SMPTE Standard 429-6-2006. D-Cinema Packaging—MXF Track File—Essence Encryption. 2006. Published by the Society of Motion Picture and Television Engineers.

* cited by examiner

*Primary Examiner* — Albert Decady
*Assistant Examiner* — Enam Ahmed
(74) *Attorney, Agent, or Firm* — Patent GC LLC

(57) ABSTRACT

A method and system are provided for efficiently verifying the integrity of file-based video audio and other essence in a content production system. The method involves creating a sequence of hash codes for the editable units of the essence, which are stored as metadata apart from the content (either in a separate file or in a separate portion of the same file), and are correlated to the content by a time label (which may be an offset or a timecode number). Upon retrieval from storage, the hash codes are generated for the retrieved essence and compared to the stored hash codes to verify that the content has not been modified.

20 Claims, 6 Drawing Sheets

CONTENT INTEGRITY MANAGEMENT SYSTEM

CROSS REFERENCE TO RELATED APPLICATIONS

This application is a nonprovisional application claiming under 35 U.S.C. §119, priority to and the benefits of U.S. provisional patent application Ser. No. 61/255,501, filed on Oct. 28, 2009, which is hereby incorporated by reference.

BACKGROUND

Digital media production commonly uses source material originating from video cameras, film scanners, animation systems, and diverse sound sources covering dialog, music and natural sound. The data from these sources is called "essence". Essence enters the production systems as digital data streams and as files, and is stored within systems in solid state memory, on hard disks and data tape. The essence is normally encoded as a series of editable units, called frames, of some tens of milliseconds duration.

Often, picture, sound and other sources are input simultaneously and time-synchronously, and may be stored multiplexed together as a single file, or in separate files. Frames of the essence are often labeled with a timecode number measured in hours minutes seconds and frames; in other cases the sources are labeled by their ordinal number relative to the start of a segment. The production process involves selecting subsections of the input sources and placing them adjacent in intended presentation time and by combining several source signals to produce a new composite signal. As the essence is processed through a system, it is repeatedly stored and replayed from the storage medium. The size of the data files is large, ranging from megabytes to terabytes in size, which is of a size approaching that where the bit error rate of storage media implies a not insignificant number of errors accumulating during a single production. In addition, the repeated editing operations and rearrangement of the input material provides many opportunities for inadvertent introduction of errors.

The reliability of production systems can benefit for a range of error checking and detection systems such as check codes and hash codes, however, until now, these techniques have typically been applied only to complete files which limits their applicability at multiple sequential stages of the production chain.

SUMMARY

A method and system are provided for efficiently verifying the integrity of file-based video audio and other essence in a content production system. The method involves creating a sequence of hash codes for the editable units of the essence, which are stored as metadata apart from the content (either in a separate file or in a separate portion of the same file), and are correlated to the content by a time label (which may be an offset or a timecode number). Upon retrieval from storage, the hash codes are generated for the retrieved essence and compared to the stored hash codes to verify that the content has not been modified.

DETAILED DESCRIPTION

Figure 1:
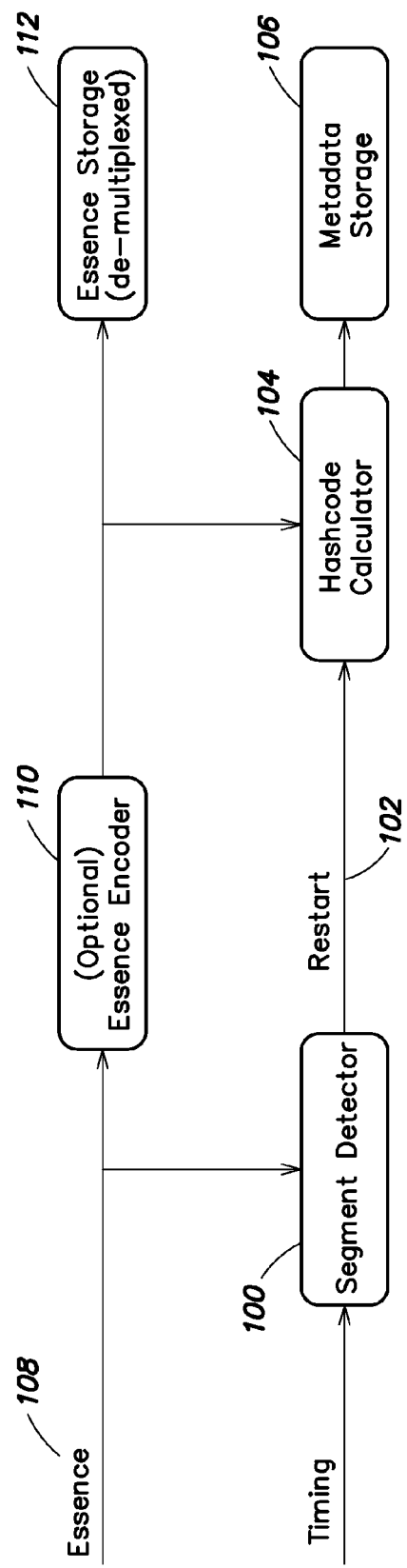
FIG. 1 is a block diagram of an example system for assigning hash codes to essence.

FIG. 1 shows an essence input 108 (with optional encoding by encoder 110) being divided into segments by a segment detector 100. To divide the source content into segments, segment boundaries may be decided based upon a simple heuristic such as a specified duration, or by examination of the input essence, to determine appropriate boundaries based on some timing. The source content may be supplied as multiplexed essence, or it may be supplied as individual inputs. If it supplied multiplexed, the essence may be separated into its component parts before calculating the hash codes and for storage 112, to enable independent editing of the component parts in later stages of the system. The source content may be encoded by encoder 110, for example using a compression algorithm, prior to calculating the hash code. Optionally, an identifier of the originator of the essence may be provided. The identifier may be stored along with the calculated hash code in the metadata storage.

The hash code is calculated by hash code calculator 104 starting at each segment boundary as signaled by the restart signal 102, and the resultant hash codes are forwarded to the metadata storage 106. A variety of different kinds of hash codes may be used, depending on the application. In applications where the objective is to recover from accidental modification to the essence, a hash function such as CRC-32 or other similar function is sufficient. In applications where security is intended against malicious attacks on the essence, a more secure hash function, such as SHA-256 or similar variants, may be used. Metadata storage may be in the same file as the essence storage, or it may be in a separate file.

Figure 2:
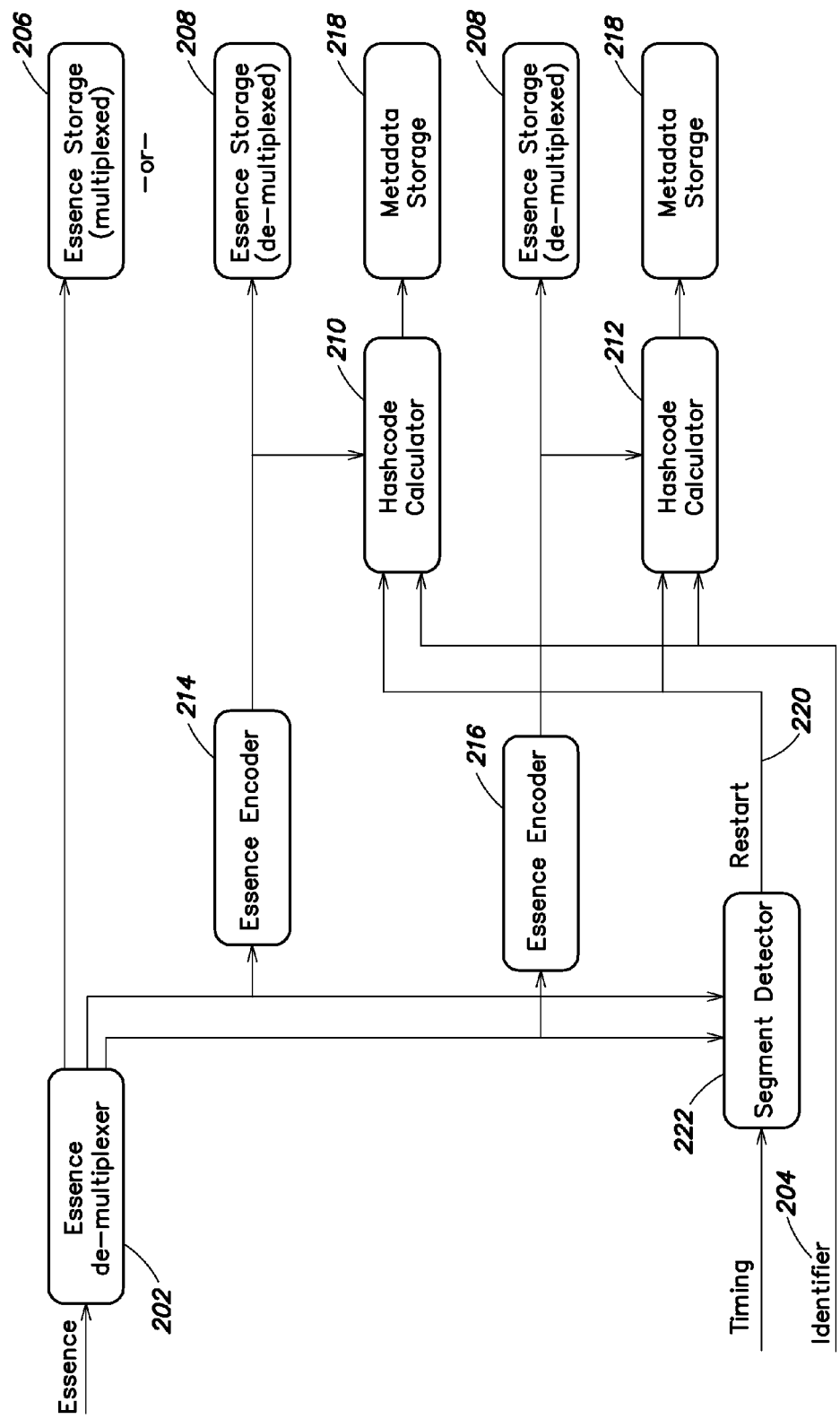
FIG. 2 is a block diagram of an example system for assigning hash codes to multiplexed essence.

FIG. 2 shows an extended arrangement in which essence input 202 is first demultiplexed by demultiplexer 200. Hash codes are calculated by hash code calculators 210, 212 on segments of the individual components of the demultiplexed essence, as controlled by the restart signal 220 from segment detector 222, and stored in metadata storage 218. Each component also may be optionally encoded with encoders 214, 216 prior to hash code calculation and storage. FIG. 2 also shows the including of the source identifier 204. FIG. 2 also shows that the content essence may be stored in its multiplexed form in storage 206 or as individual components in storage 208.

Figure 3:
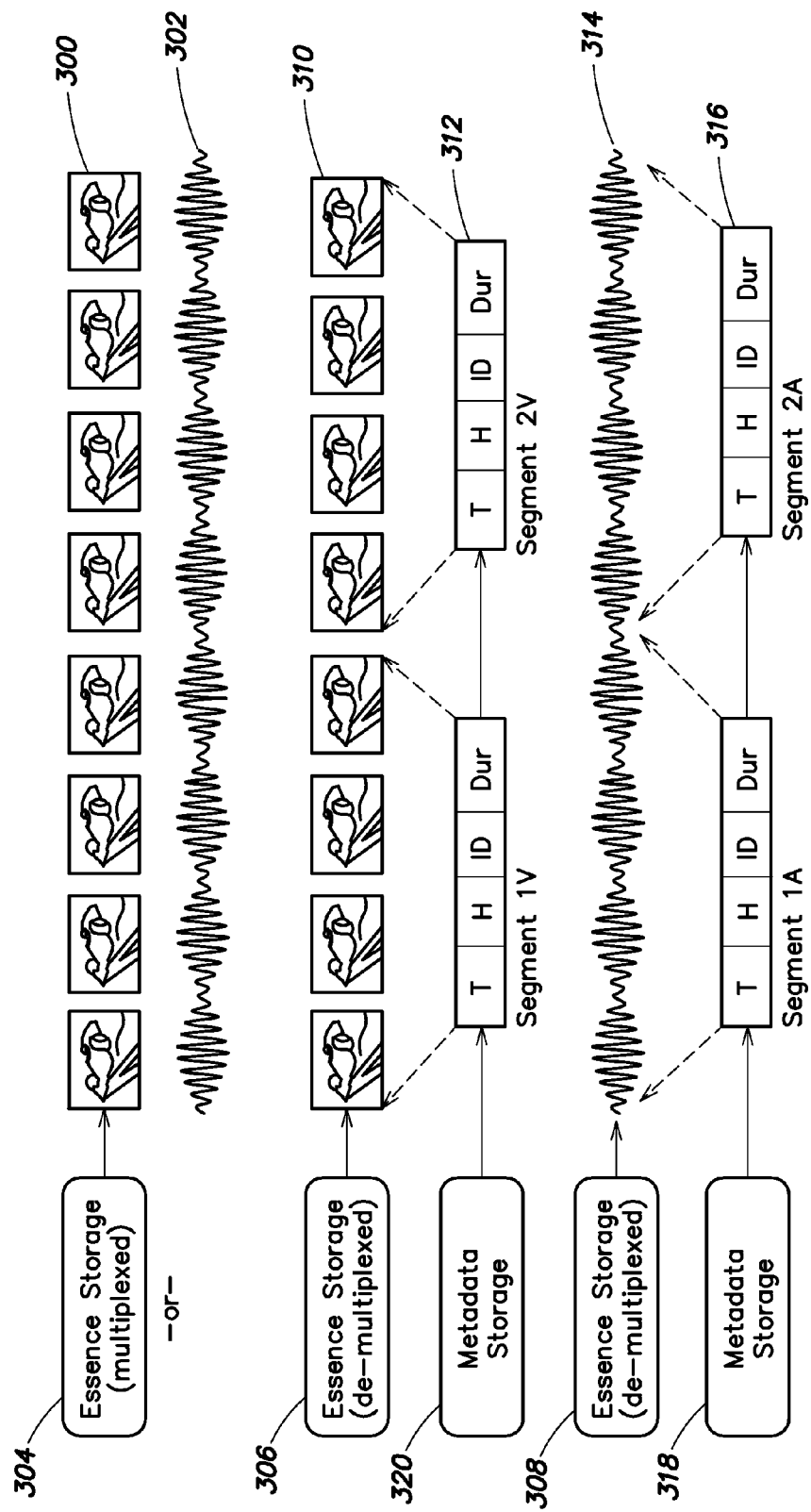
FIG. 3 is an illustrative example of how metadata is stored in association with its essence.

FIG. 3 illustrates the essence and metadata resulting from both multiplexed and demultiplexed modes of FIG. 2. Hash codes are stored as N-tuples including the starting time or timecode within the source (T), the hash code (H), the optional identifier (ID) and the segment duration (Dur). For example, the essence storage 304 may store video data 300 and audio data 302 in multiplexed forms. The essence storage 306 may store demultiplexed video data 310, and essence storage 308 may store demultiplexed audio data 314. Metadata storage 320 stores the N-tuples 312 corresponding to video data 310. Metadata storage 318 stores the N-tuples 316 corresponding to audio data 314.

The hash codes of selected content may be recalculated and checked against the stored hashes at corresponding time labels, and success or error notifications generated as desired.

Figure 4:
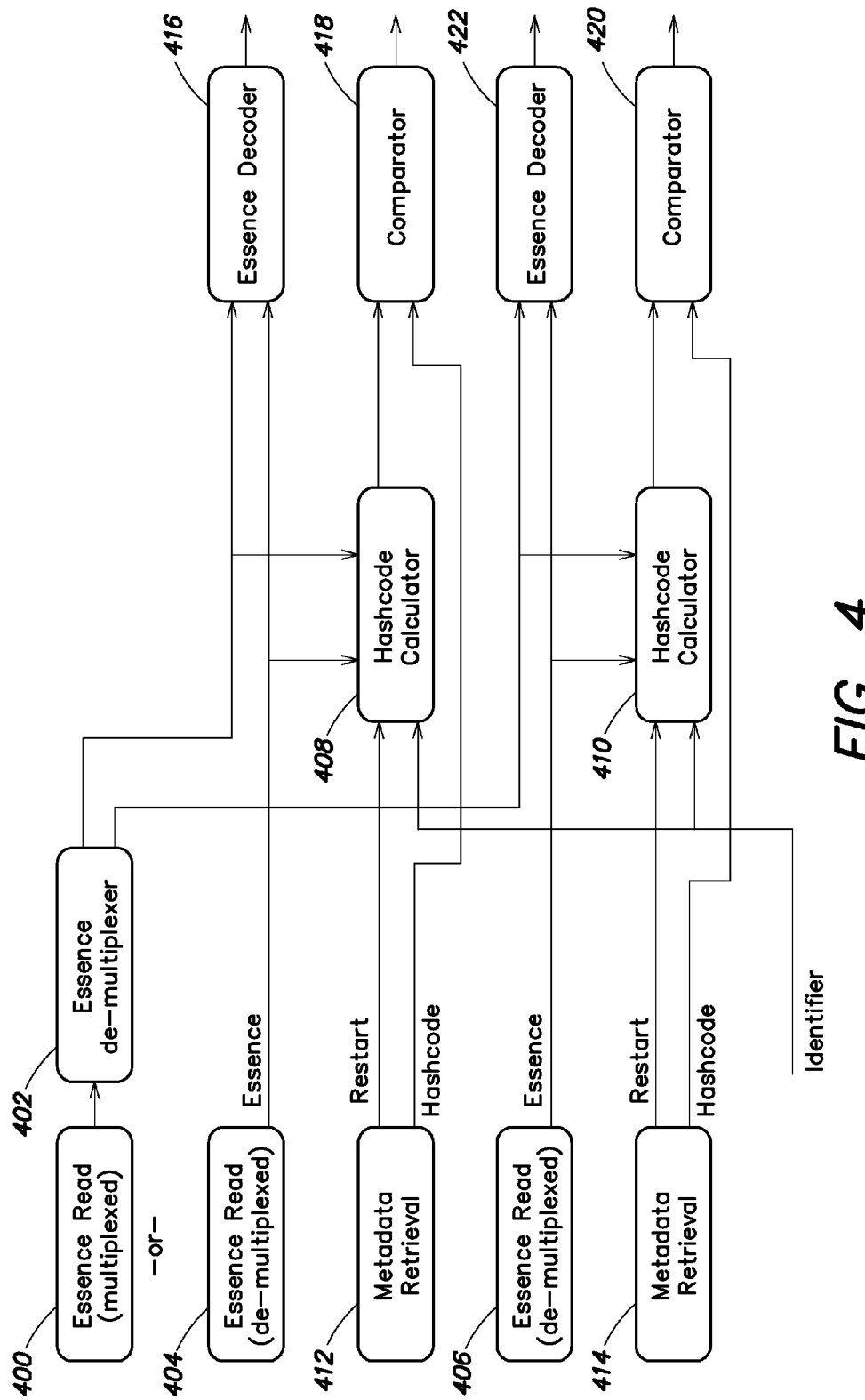
FIG. 4 is a block diagram of an example system for decoding hash codes for essence.

Referring now to FIG. 4, upon subsequent retrieval of the content from storage 404, 406 or 400 (through demultiplexer 402), the stored time and duration signal from metadata storage 412, 414 are provided to a hash code calculator 408, 410 to recalculate the hash code of each segment of the stored essence, which is then compared by comparator 418, 420 against the stored hash code from metadata storage 412, 414 to provide an indication to the operator that the retrieved essence is unchanged from the original stored essence. The essence may then be decoded by decoder 416, 422 for subsequent display or processing.

Figure 5:
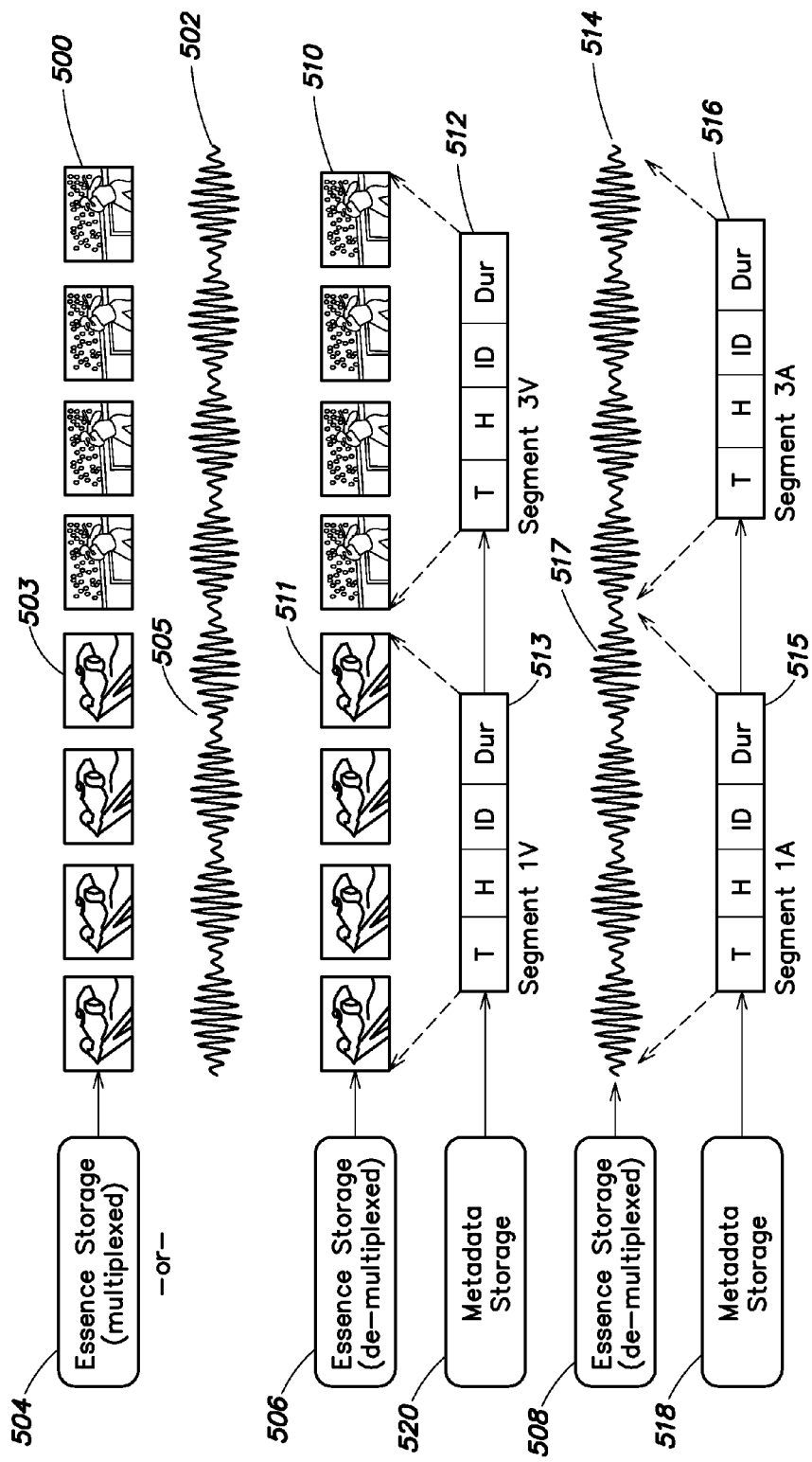
FIG. 5 is an illustrative example of how hash codes are decoded.

Segments of content from different sources may be selected from storage and displayed or re-stored as adjacent segments. FIG. 5 illustrates this process (for both multiplexed and non-multiplexed essence). In FIG. 5, a segment from a first source (503, 505 multiplexed; 511, 517 demultiplexed) is placed adjacent to a segment from a second source (500, 502 multiplexed; 510, 514 demultiplexed). The metadata (513, 512 for video; 515, 516 for audio) corresponding to the selected source segments are used in the same relative arrangement. Thus the essence and metadata may then be retrieved from storage (504, 506, 508 for essence; 518, 520 for metadata) and the hash codes compared using the same methods as in FIG. 4.

The editing process may require modification of selected editable units of the content, because the desired segment boundaries in the edited content are different from the boundaries in the original source.

Figure 6:
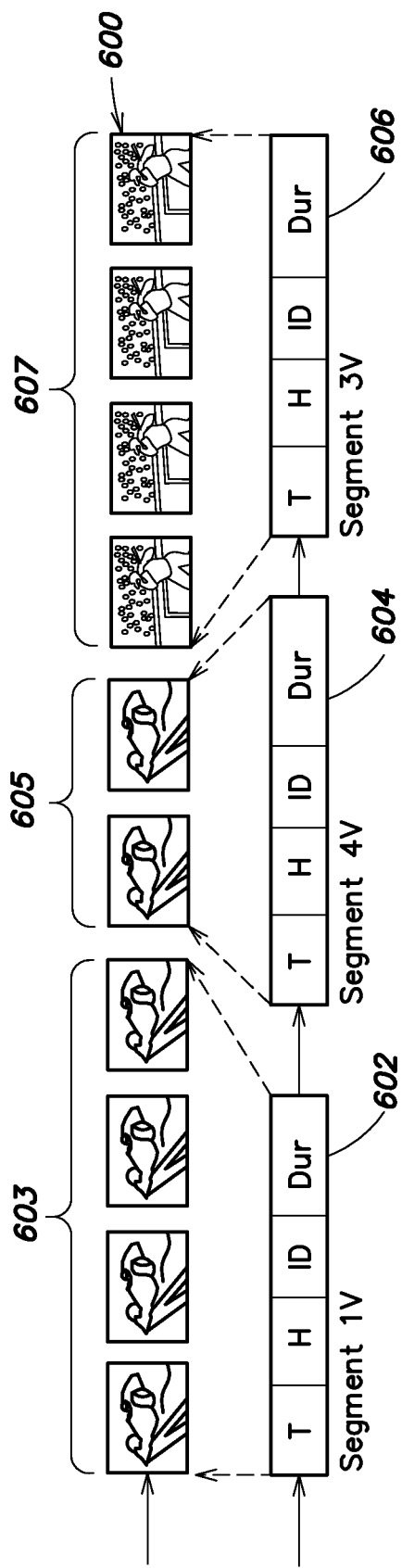
FIG. 6 is an illustrative example of how hash codes are modified in response to editing operations.

FIG. 6 illustrates this for a simple case in which the desired ending point of the first source in an edited program 600 occurs at a different point from the original boundary. In this example, segment 1V (603 essence; 602 metadata) and segment 3V (607 essence) are unchanged from the original stored values. A new N-tuple is calculated for segment 4V (605 essence; 604 metadata).

The editing process may also require modification of selected editable units of the content, for example when different essence is combined with a visual effect. In this case, the same method may be employed. New hash codes are calculated only for those editable units that have been modified.

The techniques described above can be implemented in digital electronic circuits, or in computer hardware, firmware, software executing on a computer, or in combinations of them. The techniques can be implemented as a computer program product, i.e., a computer program tangibly embodied in tangible, machine-readable storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions described herein by operating on input data and generating output. Method steps can also be performed by, and apparatus of the invention can be implemented as, special purpose logic circuitry, e.g., an FPGA (field programmable gate array) or an ASIC (application-specific integrated circuit). Applications can refer to portions of the computer program and/or the processor or other circuits that implement that functionality. Processors suitable for the execution of a computer program include, by way of example, both general and special purpose microprocessors, and any one or more processors of any kind of digital computer. Generally, a processor will receive instructions and data from a read-only memory or a random access memory or both. A general purpose computer includes a processor for executing instructions and one or more memory devices for storing instructions and data. Generally, the computer will also include, or be operatively coupled to receive data from or transfer data to, or both, one or more mass storage devices for storing data, e.g., magnetic, magneto-optical disks, or optical disks. Storage media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A computing system can include clients and servers. A client and server are generally remote from each other and typically interact over a communication network. The relationship of client and server arises by virtue of computer programs running on the respective computers and having a client-server relationship to each other.

Having described an example embodiment, it should be apparent to those skilled in the art that the foregoing is merely illustrative and not limiting, having been presented by way of example only. Numerous modifications and other embodiments are with the scope of ordinary skill in the art and are contemplated as falling with the scope of the invention.

What is claimed is

1. A process for managing integrity of content comprising:
receiving source data including essence data;
identifying editable units of the essence data, each editable unit having a time label;
assigning a hash code to each editable unit of the essence data using a processor,
generating a sequence of the assigned hash codes correlated to the editable units of the essence data by time labels of the editable units of the essence data;
storing the generated sequence of hash code apart from the essence data in persistent storage for later comparison to a computed has code for a selected segment of the essence data.

2. A process for managing integrity of content comprising:
receiving data defining one or more selected segments of essence data;
retrieving hash codes associated with the selected segments of the essence data from persistent storage, the associated hash codes comprising a sequence of hash codes correlated to the editable units of the essence data by time labels of the editable units of the essence data;
accessing essence data from storage according to the selected segments;
computing a hash code for the accessed selected segments of the essence data using a processor, the computed hash codes comprising a sequence of hash codes correlated, to the editable units of the selected segments of the essence data, by time labels of the editable units of the essence data; and comparing the computed hash codes to the associated hash codes received from persistent storage for the selected segments of the essence data.

3. A computer system for managing integrity of content comprising:
- an input for receiving source data including essence data;
- a processor having an input for receiving the essence data and an output for providing a sequence of hash codes, including a hash code calculated for each editable unit of the essence data correlated with a time label of the editable unit of the essence data; and
- an output for providing the sequence of hash codes to persistent storage for storage apart from the essence data for later comparison to a computed hash code for a selected segment of the essence data.

4. A computer system for managing integrity of content comprising:
- memory for receiving data defining one or more selected segments of essence data, the essence data having an associated sequence of hash codes stored apart from the essence data in persistent storage, the associated sequence of hash codes being correlated to the editable units of the essence data by time labels of the editable units of the essence data;
- a processor having an input for receiving the essence data from storage according to the selected segments and an output for providing a sequence of hash codes calculated from the selected segments of the essence data, the calculated sequence of hash codes correlated, to the editable units of the selected segments of the essence data, by time labels of the editable units of the essence data; and
- a comparator having an input for receiving the calculated sequence of hash codes and the received sequence of hash codes for the selected segments of the essence data and an output for providing a comparison result.

5. The process of claim 1, wherein the sequence of hash codes is stored in a separate portion from the essence data in a data file storing both the sequence of hash codes and the essence data.

6. The process of claim 1, wherein the sequence of hash codes is stored in a data file separate from a data file in which the essence data is stored.

7. The process of claim 1, wherein the sequence of hash codes is stored as an N-tuple including a starting time label within a source and the hash code.

8. The process of claim 7, wherein the N-tuple further includes an identifier for the source.

9. The process of claim 1, wherein the time labels are time codes.

10. The process of claim 1, wherein the time labels are ordinal numbers relative to a start of a segment of essence data.

11. The process of claim 2, wherein the sequence of hash codes is stored in a separate portion from the essence data in a data file storing both the sequence of hash codes and the essence data.

12. The process of claim 2, wherein the sequence of hash codes is stored in a data file separate from a data file in which the essence data is stored.

13. The process of claim 2, wherein the sequence of hash codes is stored as an N-tuple including a starting time label within a source and the hash code.

14. The process of claim 13, wherein the N-tuple further includes an identifier for the source.

15. The process of claim 2, wherein the time labels are time codes.

16. The process of claim 2, wherein the time labels are ordinal numbers relative to a start of a segment of essence data.

17. The process of claim 2, wherein the retrieved hash codes are for an original stored essence data and the computed hash codes are for retrieved essence data from a re-stored segment of the essence data.

18. The computer system of claim 3, wherein the sequence of hash codes is stored in a separate portion from the essence data in a data file storing both the sequence of hash codes and the essence data.

19. The computer system of claim 4, wherein the sequence of hash codes is stored in a separate portion from the essence data in a data file storing both the sequence of hash codes and the essence data.

20. The computer system of claim 4, wherein the retrieved hash codes are for an original stored essence data and the computed hash codes are for retrieved essence data from a re-stored segment of the essence data.

* * * * *